United States Patent

[11] 3,561,750

[72] Inventor Howard L. Woodrum
    Stillwater, Okla.
[21] Appl. No. 762,417
[22] Filed Sept. 25, 1968
[45] Patented Feb. 9, 1971
[73] Assignee Amerace Esna Corporation
    New York, N.Y.
    a corporation of Delaware

[54] HOSE STRAIGHTENING FIXTURE
    4 Claims, 6 Drawing Figs.
[52] U.S. Cl. .................................................. 269/269,
    29/200
[51] Int. Cl. .................................................. B25b 1/24
[50] Field of Search .......................................... 248/49;
    269/1.39, 265—269, 270; 29/200(P), 200(J);
    72/369, 416; 81/(Inquired)

[56] References Cited
    UNITED STATES PATENTS
    3,251,216  5/1966  Broske ............................ 227/10X
    1,194,058  8/1916  Neumayer ...................... 269/268XV
    2,242,080  5/1941  Kurzina ......................... 269/270
    2,615,238  10/1952 Highwood ...................... 269/268XV Primary Examiner—Andrew R. Juhasz
Assistant Examiner—Donald D. Evenson
Attorney—Kane, Dalsimer, Kane, Sullivan and Krucz ABSTRACT: A fixture for holding curved rubber hose in a substantially straight condition comprising two arcuate members which are movable toward and away from one another with one of the members having surface interrupting knobs which press against the hose outside curvature to reduce the distance to the same as the inside curvature.

PATENTED FEB 9 1971

INVENTOR
HOWARD L. WOODRUM

BY
Kane, Dalsimer, Kane, Sullivan and Smith
ATTORNEYS

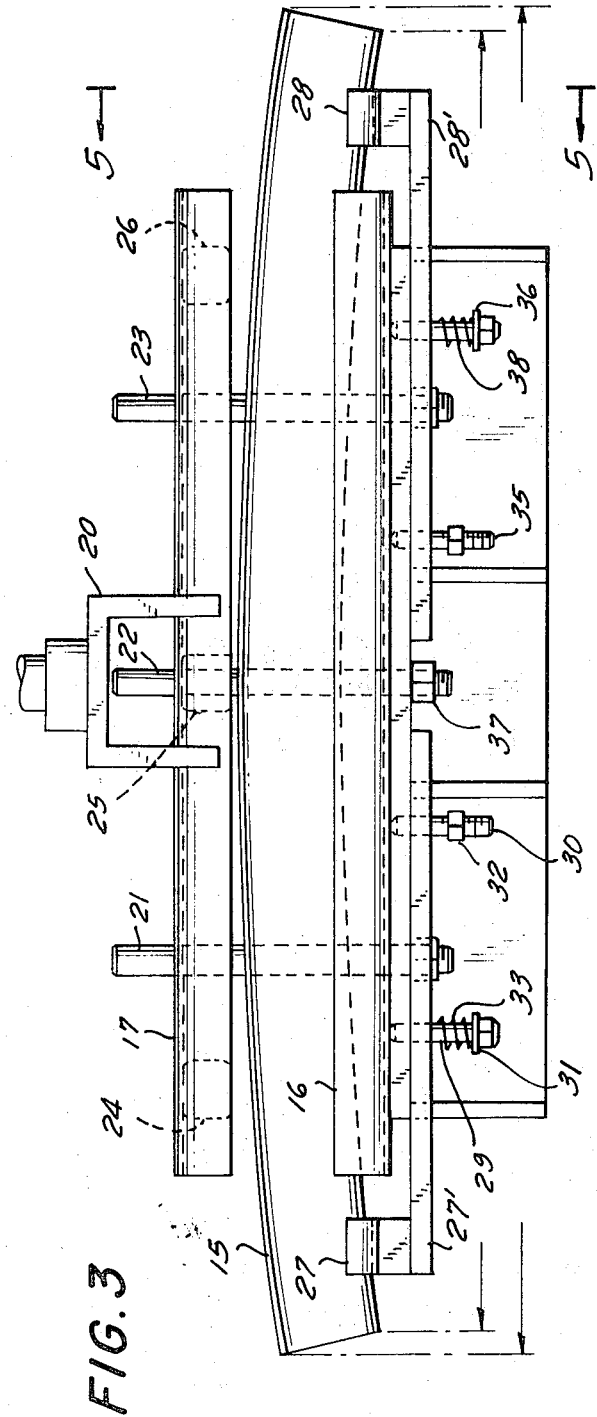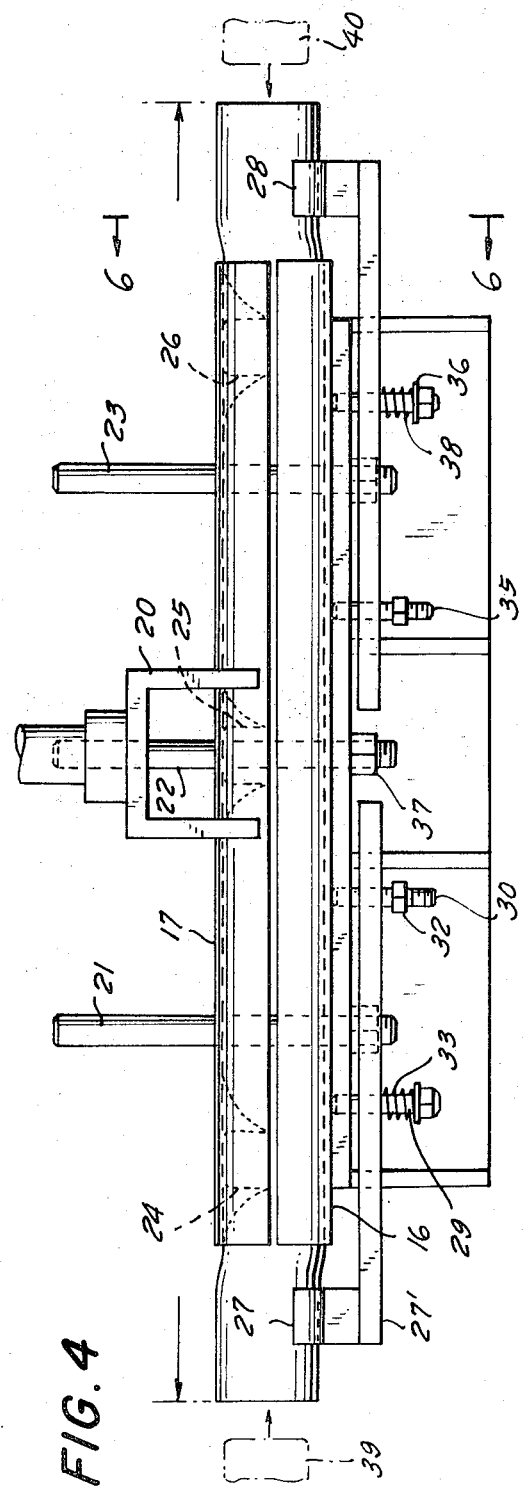

INVENTOR
HOWARD L. WOODRUM
BY
Kane, Dalsimer, Kane, Sullivan & Smith
ATTORNEYS

HOSE STRAIGHTENING FIXTURE

BACKGROUND OF THE INVENTION

In coupling train cars together a short piece of hose is used having coupling members at either end thereof. In the art, one of these coupling members is called a "glad hand" and the other is identified as a "short shank" coupling. Historically the hose member was straight. However, it was found that a hose member of arcuate or curbed configuration would be superior since the arcuate shape would prevent the free end from dragging on the ground when the car was not coupled to another, and also the arcuate form would allow easier coupling of the free end.

In use, the hose would wear out, however, the glad hand and short shank coupling members would not. The railroad maintenance men would, upon determining by inspection that a hose had reached the condition where it was no longer useful, remove the coupling members and apply these to another hose. The common practice was to push the glad hand and short shank coupling members into the hose ends by force of cylinders applied axially one against the other. Difficulty was therefore encountered in maintenance shops in fitting the glad hand and short shank coupling to the arcuate tube. With the curbed hose it was impossible to press the coupling members into the ends by application of force applied axially at each end. The hose being very rigid, it was found impossible to straighten it out.

SUMMARY OF THE INVENTION

A fixture for holding curbed rubber hose in a substantially straight condition having first and second facing arcuate pipe members with the second pipe member being movable toward and away from the first pipe member and a plurality of spaced knob members projecting from the movable pipe member in the direction of the rigid pipe member.

DESCRIPTION OF THE DRAWINGS

In the drawings:

FIG. 3 is a plan view of the fixture shown in FIG. 2 in open condition;

FIG. 4 is a view similar to that of FIG. 3 but with the fixture shown in closed condition;

DESCRIPTION OF THE INVENTION

Figure 1:
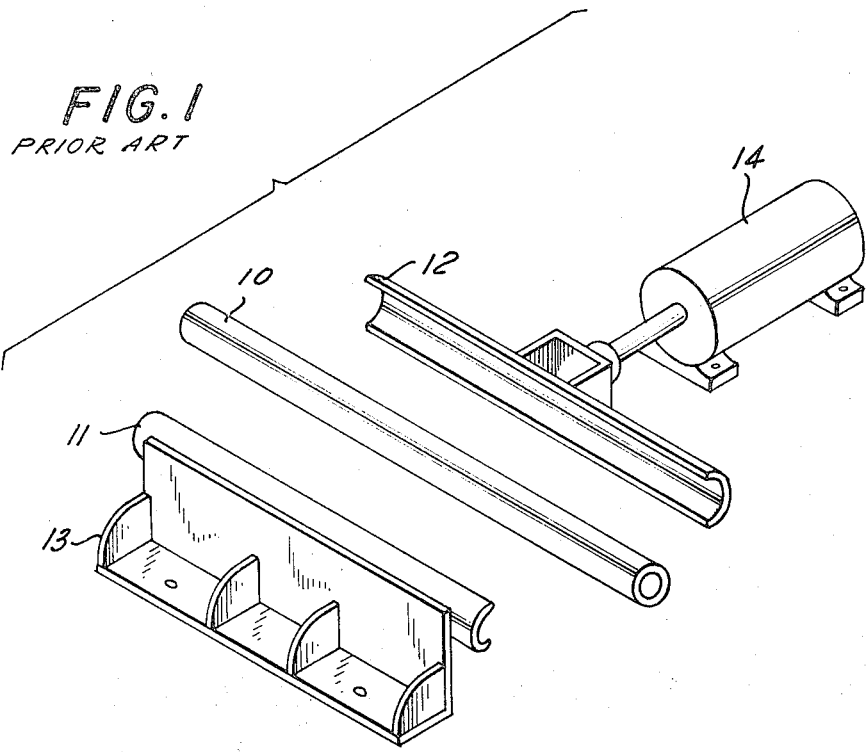
FIG. 1 is an exploded perspective view of a prior art device for holding the rubber tubing while the coupling em members are affixed thereto.

In FIG. 1 a prior art fixture of the type used in affixing the coupling members to the end of a straight piece of hose is shown. Hose 10 is to be held in position by arcuate pipe members 11 and 12. Pipe member 11 is supported in a stationary position by support means 13 and pipe member 12 is supported by clamping cylinder 14, which support is constructed and arranged to move the pipe member 12 toward and away from member 11 to enable the clamping of hose 10 thereby. Clamping cylinder 14 can be pneumatic, hydraulic, or any combination or variation which is well known in the art.

Figure 2:
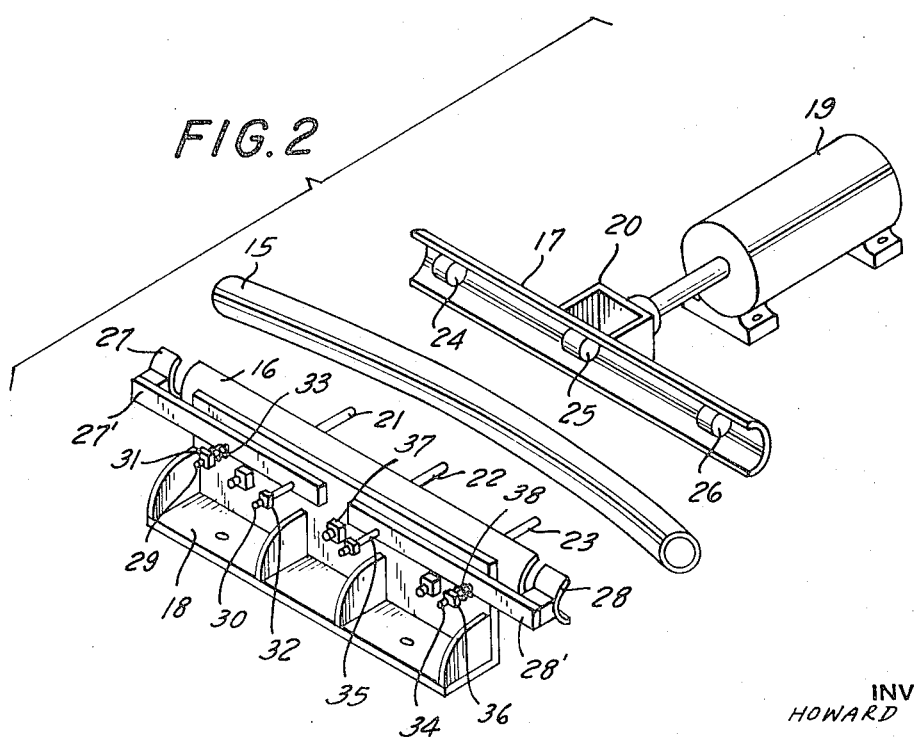
FIG. 2 is an exploded perspective view of a fixture constructed in accordance with the teachings of this invention.

In FIG. 2 a fixture constructed in accordance with the teachings of this invention is illustrated in open position with curbed position with curved hose 15 shown.

The device illustrated in FIG. 2 includes arcuate pipe member 16 and 17, first support means 18 for pipe member 16 and clamping cylinder 19 connected to and supporting pipe member 17 by means of bracket 20.

Figure 5:
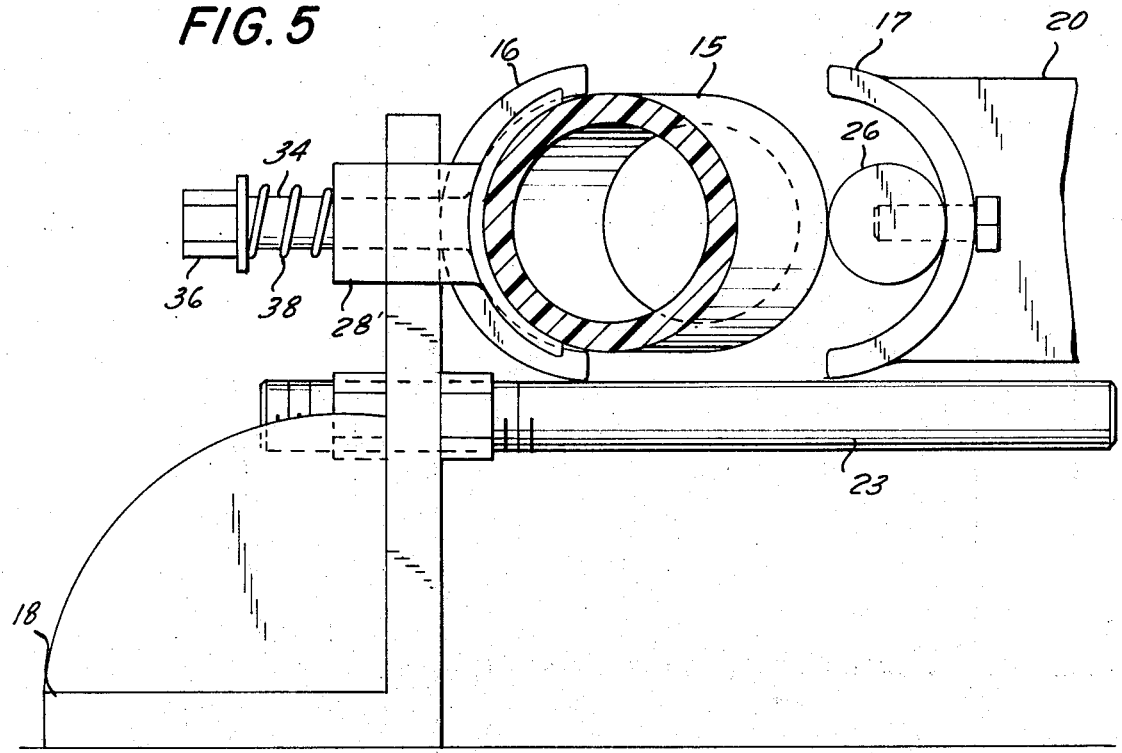
FIG. 5 is a sectional view taken along the line 5–5 in the direction of the arrow in FIG. 3.
Figure 6:
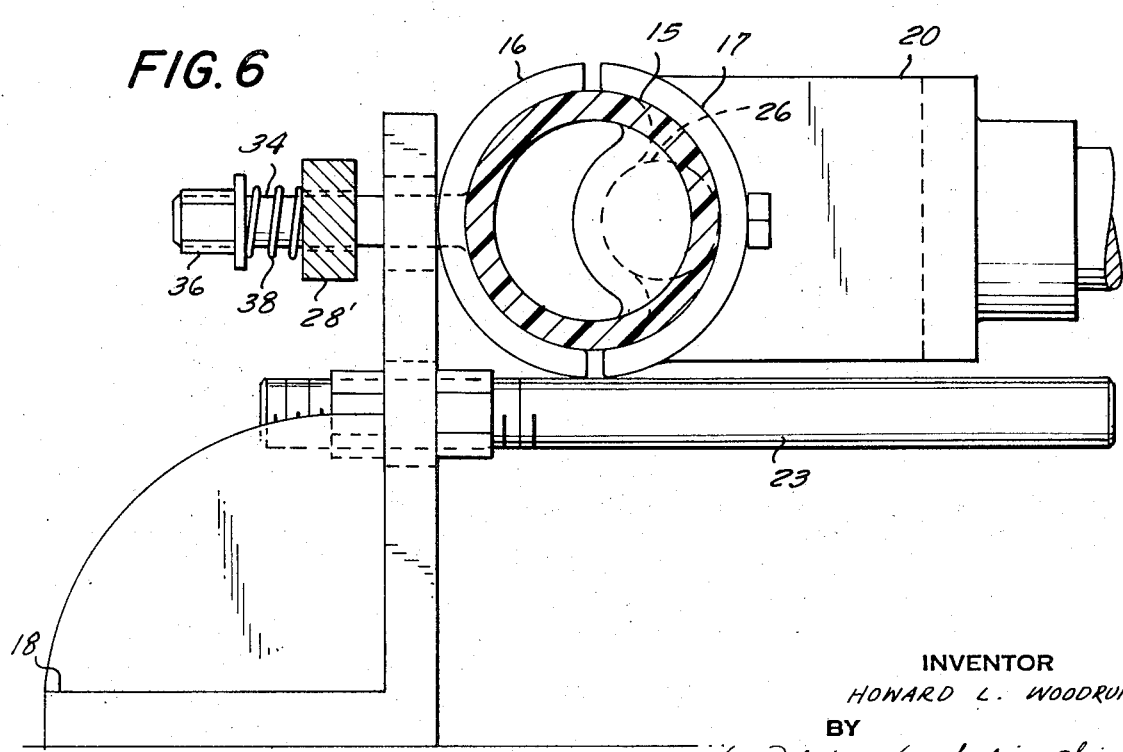
FIG. 6 is a sectional view taken along the line 6–6 in the direction of the arrow in FIG. 4.

Guide means in the form of three rods 21, 22 and 23 project from the first support means 18 beneath pipe members 16 and 17 as seen best in FIGS. 5 and 6. It is noted therein that the lowermost edge of each of the pipe members 16 and 17 touch the rods.

Cylindrical knobs 24, 25 and 26 project from the arcuate surface of pipe member 17 toward the arcuate face surface of pipe member 16. The knobs 24, 25 and 26 which have the same axis are spaced one from another and as seen in FIG. 6 do not extend to touch arcuate surface of pipe member 16 in the closed condition of the fixture.

As shown in the FIGS. in the embodiment herein arcuate pipe members 16 and 17 are of approximately the same length.

The pipe member 16 is provided at either end with an arcuate section referred to herein as a helper which is spaced from the pipe member 16.

Helper 27 is supported by bracket 27' mounted on rods 29 and 30 projecting from the support means 18. Bolts 31 and 32 are respectively threaded onto rods 29 and 30 and a spring 33 is mounted on rod 29 to yieldingly urge helper 27 forwardly. Likewise, helper 28 is supported by bracket 28' mounted on rods 34 and 35 held there by bolts 36 and 37 with spring 38 yieldingly urging the helper 28 forwardly.

The purpose of the fixture is to lay out straight the curved hose to allow the couplings to be pushed in both ends at the same time. In order to straighten the hose, the distance over the outside of curvature must be reduced to the same distance as the inside curvature. To accomplish this, the straight line distance must be disrupted and over hills and valleys. This will pull the outside curvature of the hose into a shorter distance and, in effect, will straighten the hose. This is what the fixture with the three cylindrical knobs 24, 25 and 26 on the inside or face of pipe member 17 will accomplish. The helpers on the stationary half of the fixture help to pull the ends in alignment and make a more positive alignment in a shorter period of time.

In use, the hose is placed in the fixture as shown in FIG. 3 and the clamping cylinder actuated to bring pipe member 17 toward pipe member 16 with the guide means 21, 22 and 23 maintaining the proper alignment. The helper helps to push the hose ends into position and the knobs distort the hose in order to provide a substantially straight hose within the fixture. After this has occurred, the coupling members 39 and 40 are forced into the ends of the tube, as shown in FIG. 4, by cylinders applying axial force. It is noted that an imaginery line on each of the knobs substantially parallel to the knob axis embraces or contacts the hose first, as the pipe members are brought together, on an imaginary line on the surface of the hose substantially parallel to its axis.

Thus, it is seen that with the device shown herein coupling members can be applied to curved hosing in maintenance shop work in substantially the same manner as they had been applied to straight hosing.

As used herein, the terms tubing and hose are understood to be used interchangeably and refer to both reinforced and nonreinforced structures, and it should also be understood that although the invention is described in terms of rubber hose it can be used with all types of elastomeric materials.

I claim:

1. A device for holding curved rubber tubing in a substantially straightened position including first and second arcuate pipe members, first and second pipe members, first and second arcuate surfaces of said first and second pipe members, first and second support means for maintaining said arcuate surfaces in facing relationship, said support means being constructed and arranged to move at least one of si said pipe members toward and away from the remaining pipe member and a plurality of spaced knob members projecting from said second arcuate surface toward said first arcuate surface and spaced from said first arcuate surface, each of said know knob members having a surface portion defining a line which is disposed to first contact a hose disposed in said device substantially parallel to its axis and said first arcuate surface having an uninterrupted semicylindrical surface.

2. A device for holding curved rubber tubing in a substantially straightened position in accordance with claim 1 in which a helper member is provided at either end of one of said arcuate pipe members and spaced therefrom and which is yieldingly urged forwardly.

3. A device for holding curved rubber tubing in a substantially straightened position including first and second arcuate pipe members, first and second arcuate surfaces of said first and second pipe members, first and second support means for maintaining said arcuate surfaces in facing relationship, said support means being constructed and arranged to move at least one of said pipe members toward and away from he the remaining pipe member and a plurality of spaced knob members projecting from said second arcuate surface toward said first arcuate surface and spaced from said first arcuate surface, and a plurality of guide means mounted on one of said support means beneath said pipe members supporting and maintaining the alignment of said pipe members during movement thereof.

4. A device for holding curved rubber tubing in a substantially straightened position including first and second arcuate pipe members, first and second arcuate surfaces of said first and second pipe members, first and second support means for maintaining said arcuate surfaces in facing relationship, said support means being constructed and arranged to move at least one of said pipe members toward and away from the remaining pipe member and a plurality of spaced knob members projecting from said second s arcuate surface toward said first arcuate surface and spaced from said first arcuate surface, an arcuate section at either end of one of said arcuate pipe members substantially aligned therewith and spaced therefrom and spring means yielding urging each of said arcuate members forwardly.

PO-1050
(5/69)

UNITED STATES PATENT OFFICE
CERTIFICATE OF CORRECTION

Patent No. 3,561,750            Dated   February 2, 1971

Inventor(s)  Howard L. Woodrum

It is certified that error appears in the above-identified patent and that said Letters Patent are hereby corrected as shown below:

Col. 1, line 9, "curbed" should be --curved--;
        line 31, "curbed" should be --curved--;
        line 42, delete "em" before "members";
        line 64, before "member" insert --pipe--;
        line 69, "curbed" should be --curved--;
Col. 2, line 28, insert a hyphen (-) between "straight" and "line";

Claim 1, line 3, after "members" delete "first and second pipe members,"
         line 7, after "of" delete "si";
         line 11, before "knob" delete "know";

Claim 3, line 7, delete "he" after "from";

Claim 4, line 9, after "second" delete the letter "s".

Signed and sealed this 6th day of July 1971.

(SEAL)
Attest:

EDWARD M. FLETCHER, JR.                    WILLIAM E. SCHUYLER, JR.
Attesting Officer                          Commissioner of Patents